(12) United States Patent
Nelson et al.

(10) Patent No.: US 11,619,582 B2
(45) Date of Patent: Apr. 4, 2023

(54) RETROREFLECTOMETER FOR NON-CONTACT MEASUREMENTS OF OPTICAL CHARACTERISTICS

(71) Applicant: GAMMA SCIENTIFIC INC., San Diego, CA (US)

(72) Inventors: Eric John Nelson, San Marcos, CA (US); Victor Fedoriouk, El Cajon, CA (US)

(73) Assignee: GAMMA SCIENTIFIC INC., San Diego, CA (US)

( * ) Notice: Subject to any disclaimer, the term of this patent is extended or adjusted under 35 U.S.C. 154(b) by 0 days.

(21) Appl. No.: 17/369,852

(22) Filed: Jul. 7, 2021

(65) Prior Publication Data

US 2022/0011226 A1 Jan. 13, 2022

Related U.S. Application Data

(60) Provisional application No. 63/048,992, filed on Jul. 7, 2020.

(51) Int. Cl.
 *G01N 21/55* (2014.01)
(52) U.S. Cl.
 CPC ....... *G01N 21/55* (2013.01); *G01N 2021/551* (2013.01)
(58) Field of Classification Search
 CPC .............. G01N 21/4795; G01N 21/39; G01N 21/3563; G01N 21/954; G01N 21/3504;
 (Continued)

(56) References Cited

U.S. PATENT DOCUMENTS 3,510,222 A * 5/1970 Shaw, Jr. ................ G01L 1/241
 359/837
3,784,308 A * 1/1974 Southwell .............. G01N 21/43
 356/128
(Continued)

FOREIGN PATENT DOCUMENTS

DE 102010034603 A1 * 12/2011 ............... A01G 7/00
DE 102010025704 A1 * 1/2012 ............ B60W 50/16
(Continued)

OTHER PUBLICATIONS

International Search Report and Written Opinion dated Oct. 12, 2021 for corresponding PCT Application No. PCT/US2021/040744 (13 pages).

Primary Examiner — Michael P Stafira
(74) Attorney, Agent, or Firm — Lewis Roca Rothgerber Christie LLP

(57) ABSTRACT

A retroreflectometer for non-contact measurements of optical characteristics of retroreflective materials from a range of distances includes a light source for emitting a light beam; a first moving mirror assembly for scanning the light beam; a collimating lens for collimating the scanning light on an illumination spot on the surface of the DUT; an imaging lens for receiving a reflected scanning light comprised of the collimated scanning light reflected from the surface of the DUT; a second moving mirror assembly for controlling a predetermined observation angle, wherein the first moving mirror assembly and the second moving mirror assembly moved in synchronization to maintain concentricity of the illumination spot on the surface of the DUT; a light collector for collecting the reflected light from the second moving mirror assembly; a processor including a memory for determining the optical characteristics of the surface of the DUT responsive to the collected reflected light.

13 Claims, 4 Drawing Sheets

(58) Field of Classification Search
CPC ..... G01N 2021/1793; G01N 2021/399; G01N 21/55; G01N 2201/068; G01N 21/255; G01N 21/8422; G01N 2201/08; G01N 21/35; G01N 21/49; G01N 21/8806; G01N 2201/0221; G01N 2201/0612; G01N 2021/458; G01N 21/45; G01N 21/88; G01N 2201/0846; G01N 21/272; G01N 21/3577; G01N 21/3581; G01N 2291/0256; G01N 2291/106; G01N 15/06; G01N 15/0656; G01N 2015/0693; G01N 21/1702; G01N 21/31; G01N 21/53; G01N 21/532; G01N 29/2418; G01N 21/3151; G01N 21/3554; G01N 21/6456; G01N 2021/1787; G01N 2021/4166; G01N 2021/551; G01N 2021/7779; G01N 21/211; G01N 21/253; G01N 21/453; G01N 21/474; G01N 21/59; G01N 21/6452; G01N 21/7703; G01N 21/17; G01N 21/6458; G01N 21/9515; G01N 2201/06113; G01N 2201/104; G01N 2021/3531; G01N 21/01; G01N 21/21; G01N 21/9508; G01N 1/312; G01N 15/0205; G01N 2021/1706; G01N 21/1717; G01N 21/648; G01N 21/7746; G01N 33/0027; G01N 33/54373; G01N 33/54393; G01N 35/1002; G01N 15/0211; G01N 15/1459; G01N 15/1463; G01N 2015/1486; G01N 2015/1493; G01N 2015/1497; G01N 2021/1731; G01N 2021/1795; G01N 2021/3155; G01N 2021/4153; G01N 2021/4186; G01N 2021/4709; G01N 2021/6423; G01N 21/171; G01N 21/4133; G01N 21/43; G01N 21/4738; G01N 21/6428; G01N 21/65; G01N 21/718; G01N 2201/0697; G01N 2201/082; G01N 2201/12; G01N 29/0681; G01N 2021/216; G01N 2021/3595; G01N 2021/4173; G01N 2021/4704; G01N 2021/4735; G01N 2021/4742; G01N 21/41; G01N 21/47; G01N 21/6408; G01N 21/958; G01N 2201/0633; G01N 2201/065; G01N 2291/0255; G01N 2291/02881; G01N 2291/0427; G01N 29/036; G01N 1/28; G01N 2021/0112; G01N 2021/178; G01N 2021/3185; G01N 2021/3196; G01N 2021/653; G01N 2021/656; G01N 2021/8427; G01N 2021/8841; G01N 21/031; G01N 21/631; G01N 21/636; G01N 21/658; G01N 21/84; G01N 21/95; G01N 21/9501; G01N 21/9506; G01N 2201/024; G01N 2201/061; G01N 2201/0636; G01N 2201/103; G01N 2201/1045; G01N 2201/1087; G01N 2291/02827; G01N 2291/0426; G01N 33/0016; G01N 33/50; G01N 15/1434; G01N 2015/1445; G01N 2021/174; G01N 2021/394; G01N 2021/4792; G01N 2021/6441; G01N 2021/8411; G01N 2021/8438; G01N 2021/8472; G01N 2021/8609; G01N 21/25; G01N 21/27; G01N 21/3586; G01N 21/5907; G01N 21/63; G01N 21/86; G01N 21/8901; G01N 21/8915; G01N 21/94; G01N 21/95623; G01N 2201/062; G01N 2201/0638; G01N 2201/0642; G01N 2201/066; G01N 2201/0691; G01N 2201/0693; G01N 2201/1293; G01N 2291/011; G01N 2291/0237; G01N 2291/02854; G01N 31/12; G01N 33/0044; G01N 33/491; G01N 33/4972; G01N 33/5005; G01N 33/5308; G01N 33/56966; G01N 33/582; G01N 2021/4711; G01N 2201/0624; G01C 15/002; G01C 3/08; G01C 25/00; G01C 1/02; G01C 15/006; G01C 15/00; G01C 15/02; G01C 15/004; G01C 21/3461; G01C 21/3626; G01C 3/02; G01C 15/008; G01C 21/26; G01C 1/00; G01C 11/00; G01C 3/10; G01C 3/16; G01C 15/04; G01C 15/06; G01C 11/025; G01C 21/206; G01C 3/06; G01C 3/085; G01C 5/04; G01B 9/02091; G01B 9/02044; G01B 11/002; G01B 11/2441; G01B 2290/35; G01B 9/02028; G01B 11/00; G01B 2290/70; G01B 9/0209; G01B 11/24; G01B 9/02061; G01B 11/026; G01B 11/14; G01B 2290/65; G01B 2290/15; G01B 2290/45; G01B 9/02002; G01B 9/02007; G01B 11/22; G01B 9/0201; G01B 9/02018; G01B 11/005; G01B 9/02022; G01B 9/0203; G01B 9/02069; G01B 11/12; G01B 9/02027; G01B 9/02057; G01B 9/02063; G01B 9/02072; G01B 11/25; G01B 11/255; G01B 5/0037; G01B 9/02015; G01B 5/012; G01B 9/02; G01B 9/02087; G01B 11/007; G01B 11/02; G01B 2210/50; G01B 9/02049; G01B 9/02067; G01B 9/02077; G01B 11/0666; G01B 11/26; G01B 2290/30; G01B 9/02019; G01B 9/02051; G01B 11/27; G01B 11/303; G01B 11/306; G01B 9/02036; G01B 9/02041; G01B 9/02042; G01B 9/02056; G01B 11/0625; G01B 2210/58; G01B 2290/40; G01B 5/008; G01B 9/02064; G01B 9/04; G01B 11/03; G01B 11/0675; G01B 11/2518; G01B 11/28; G01B 9/02014; G01B 9/0205; G01B 9/02065; G01B 9/02068; G01B 11/30; G01B 2290/20; G01B 2290/60; G01B 9/02021; G01B 9/02031; G01B 9/02034; G01B 9/02035; G01B 9/02059; G01B 9/02071; G01B 9/02084; G01B 9/021; G01B 11/04; G01B 11/06; G01B 11/0691; G01B 11/2433; G01B 11/2513; G01B 11/2531; G01B 21/045; G01B 5/004; G01B 9/02003; G01B 9/02011; G01B 9/02032; G01B 9/02078; G01B 9/02083; G01B 11/0616; G01B 11/0641; G01B 11/065; G01B 11/2408; G01B 21/047; G01B 2210/56; G01B 9/00; G01B 9/02008; G01B 9/02009; G01B 9/02017; G01B 9/02023; G01B 9/02025; G01B 9/02074; G01B 9/02082; G01B 9/02098; G01B 11/046; G01B 11/08; G01B 11/245; G01B 11/272; G01B 21/042; G01B 21/22; G01B 2290/25; G01B 5/24;

G01B 9/02029; G01B 9/02045; G01B
9/02052; G01B 9/02058
See application file for complete search history.

(56) References Cited

U.S. PATENT DOCUMENTS

| | | | |
|---|---|---|---|
| 4,721,389 A | 1/1988 | Dejaiffe | |
| 5,473,438 A * | 12/1995 | Keranen | G01N 21/314 359/220.1 |
| 2004/0056264 A1 * | 3/2004 | Hisano | G01N 21/474 438/22 |
| 2005/0146725 A1 | 7/2005 | Hansen et al. | |
| 2006/0033911 A1 * | 2/2006 | Brown | G01N 21/474 356/326 |
| 2009/0116018 A1 * | 5/2009 | Austin | G01N 21/55 356/445 |
| 2019/0056497 A1 * | 2/2019 | Pacala | G01S 7/4863 |
| 2020/0025923 A1 * | 1/2020 | Eichenholz | G01S 17/10 |

FOREIGN PATENT DOCUMENTS

| | | | | |
|---|---|---|---|---|
| DE | 102016008184 A1 * | 1/2018 | | B23K 26/03 |
| FR | 2843197 A1 * | 2/2004 | | G01N 21/474 |
| JP | 2008076399 A * | 4/2008 | | G01N 21/474 |
| WO | WO-2013188026 A1 * | 12/2013 | | G01B 11/007 |

* cited by examiner

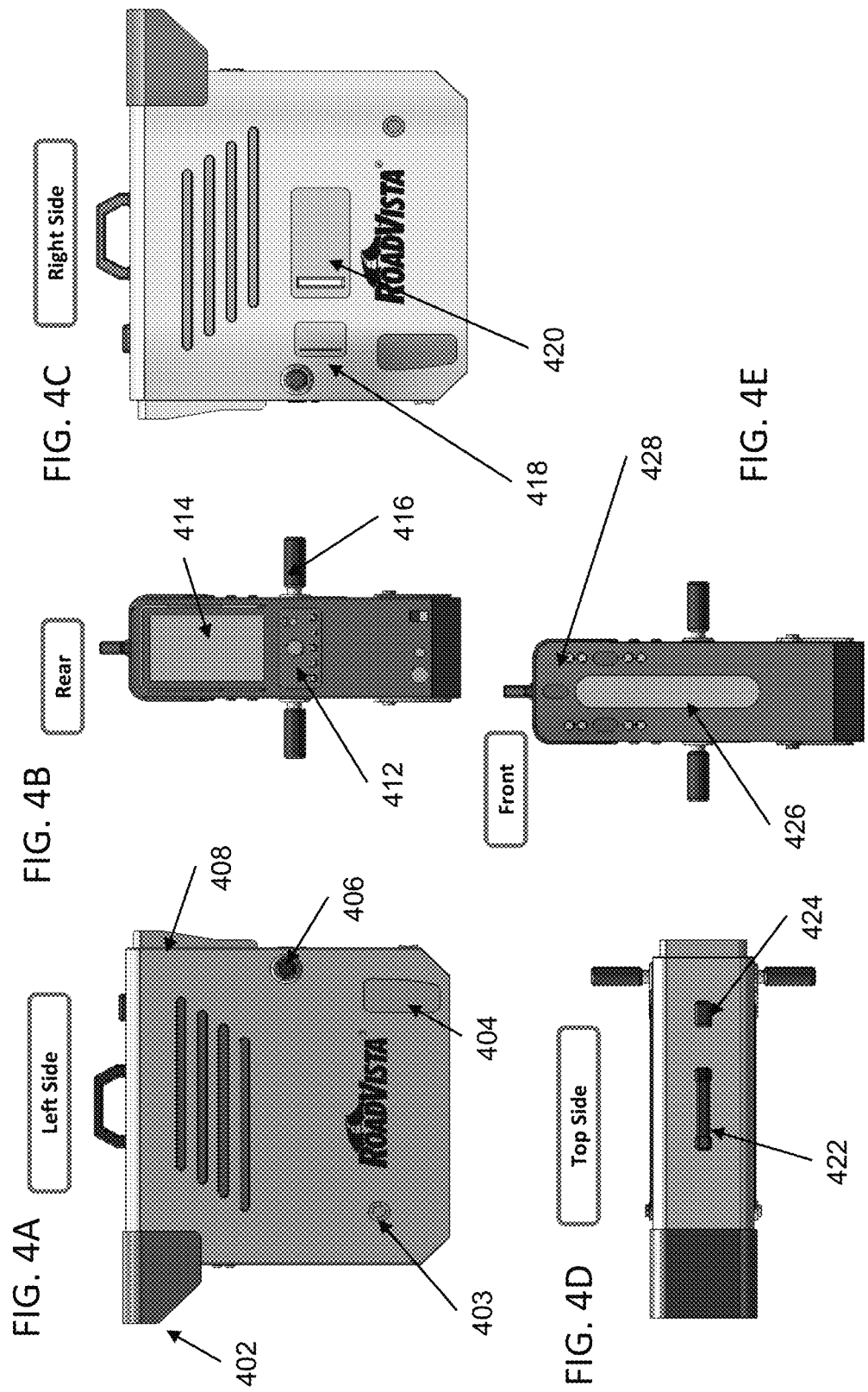

though the measurements shall beper reflectometer for non-contact measurements of optical characteristics

RETROREFLECTOMETER FOR NON-CONTACT MEASUREMENTS OF OPTICAL CHARACTERISTICS

CROSS-REFERENCE TO RELATED APPLICATIONS

This patent application claims the benefits of U.S. Provisional Patent Application Ser. No. 63/048,992, filed on Jul. 7, 2020, and entitled "Portable Retroreflectometer for Non-Contact Measurements of Optical Characteristics," the entire content of which is hereby expressly incorporated by reference.

FIELD OF THE INVENTION

The disclosed invention generally relates to optical lenses and more specifically to a folded telescopic lens system.

BACKGROUND

Traditional methods for determining the retroreflectivity of different objects at a distance, for example, road signs have included handheld devices that are placed up against the sign and measure a small spot, typically 1-inch diameter on the objects/signs. In these conventional approaches, the reflection plane mirrors reflect incident light back toward the source only if the incident light beam is perpendicular to the mirror surface. This type of device requires the operator to walk up to the object/sign to measure it. Many signs are mounted higher than can easily be reached and therefore the instrument is attached to a long pole or a lift system is used to lift the operator to the sign level. More recently, a system integrated into vehicles utilizes fixed light sources and a camera mounted on the vehicle. The system takes a series of photos of the sign and determines when it is at the correct distance from the sign for the observation angle to be correct.

American Society for Testing and Materials (ASTM) standards E1709 and E2540 specify that measurements shall be performed with a device that has an observation angle of 0.2° or 0.5°, respectively. Moreover, sign sheeting material specifications, outlined in ASTM D4956, require minimum performance values of the sign sheeting materials at specific observation angles. However, this type of system requires a dedicated vehicle, driving around at night, and is cost prohibitive for most users.

SUMMARY

The present disclosure is directed to a retroreflectometer for non-contact measurements of optical characteristics of retroreflective materials from a range of distances. In some embodiment, the disclosure is directed to a retroreflectometer for non-contact measurements of optical characteristics of a surface of a device under test (DUT). The retroreflectometer includes a light source for emitting a light beam; a first moving mirror assembly for scanning the light beam; a collimating lens for collimating the scanning light on an illumination spot on the surface of the DUT; an imaging lens for receiving a reflected scanning light comprised of the collimated scanning light reflected from the surface of the DUT; a second moving mirror assembly for controlling a predetermined observation angle, wherein the first moving mirror assembly and the second moving mirror assembly moved in synchronization to maintain concentricity of the illumination spot on the surface of the DUT; a light collector for collecting the reflected light from the second moving mirror assembly; a processor including a memory for determining the optical characteristics of the surface of the DUT responsive to the collected reflected light.

In some embodiment, the retroreflectometer may also include one or more of a display for displaying information about the optical characteristics of the surface of the DUT; a camera for capturing an image of the illumination spot on the surface of the DUT and in conjunction with a display for visual alignment of the illumination spot on the surface of the DUT; a measurement circuit for converting the collected reflected light into an electrical signal; a light trap for trapping ambient lights; and/or a laser range finder for determining a distance and orientation of the retroreflectometer to the DUT.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIGS. 4A-4E depict various views of a retroreflectometer, according to some embodiments of the present disclosure.

DETAILED DESCRIPTION

Some embodiments of the present invention are directed to a portable retroreflectometer for non-contact measurements of optical characteristics of retroreflective materials from a range of distances. An example of the optical material is the material typically used to make highway and street signs and safety markers that are elevated and not easily reached by operators. Unlike conventional reflection plane mirrors, which reflect incident light back toward the source only if the incident light beam is perpendicular to the mirror surface, the retroreflective materials reflect a non-perpendicular incident beam back toward the source. Elevated highway signs and markers illuminated by vehicle headlights can thus be seen and understood by a driver whose eyes are positioned above the illuminating headlights of the vehicle. The retroreflectometer enables verification of the optical characteristics of the signs and markers, and the level of degradation of retroreflectivity of a worn, weathered, dirty, or otherwise partially obscured sign or marker.

According to the present disclosure, a non-contact system and method for measuring the nighttime photometric and colorimetric retroreflectivity of retroreflective sheeting used commonly on road signs and traffic delineators from many different distances. Measurements can be performed during the day or night, but the results always provide the nighttime performance characteristics of the sign.

In some embodiments, the retroreflectometer makes non-contact measurements of the characteristics of light reflected from a retroreflective surface of an object, for example, a road sign, marker, or similar surfaces, from a distance, to verify that incident light, for example, from vehicle headlights, and the desired color are visible to a driver positioned above the headlights. The retroreflectometer determines the orientation of the retroreflective object (DUT) in space by triangulating the distance to three points on the object. It then sets the angle between the light source and detectors based on the measured distance from the DUT, measures the intensity and characteristics of the reflected light, provides display and storage of the resulting data and information for the retroreflective performance of the DUT.

Figure 1:
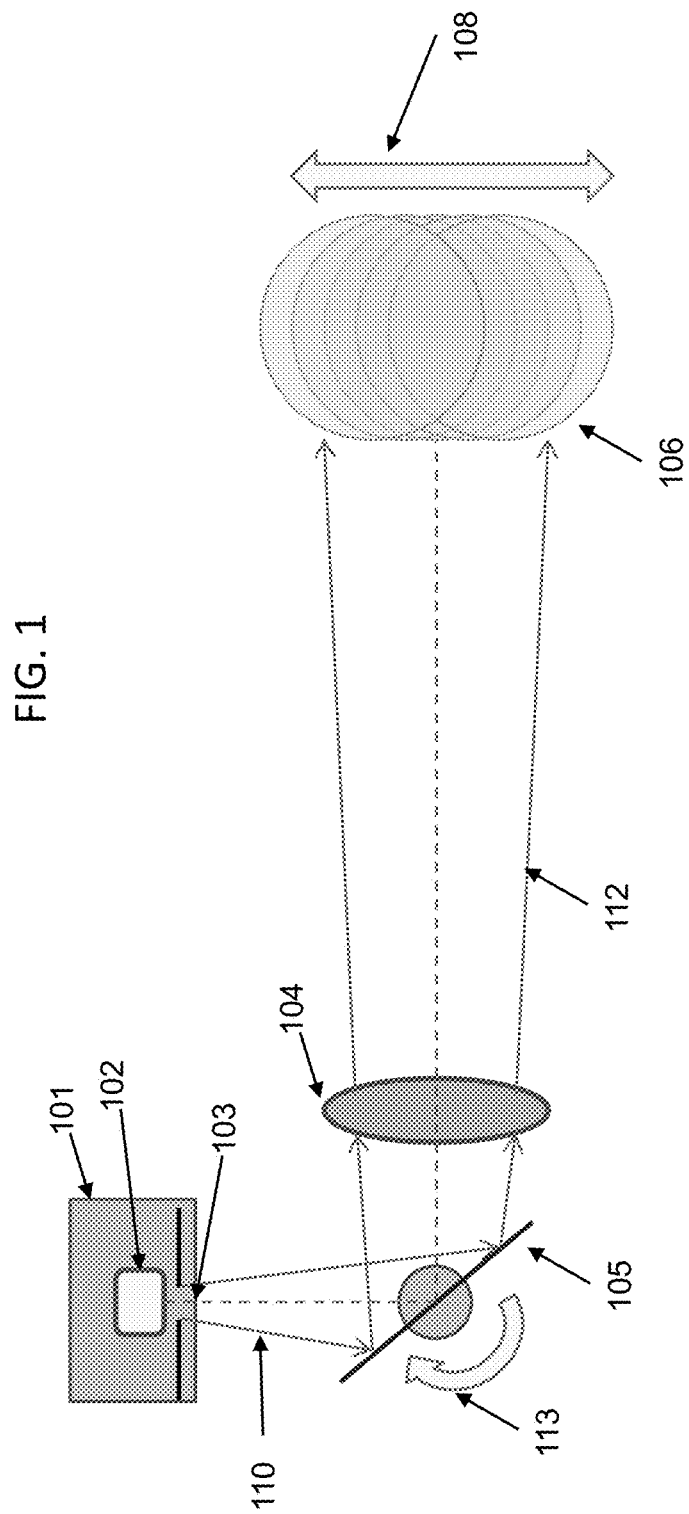
FIG. 1 is an exemplary block diagram of an illuminating optical system for a retroreflectometer, according to some embodiments of the present disclosure.
Figure 2:
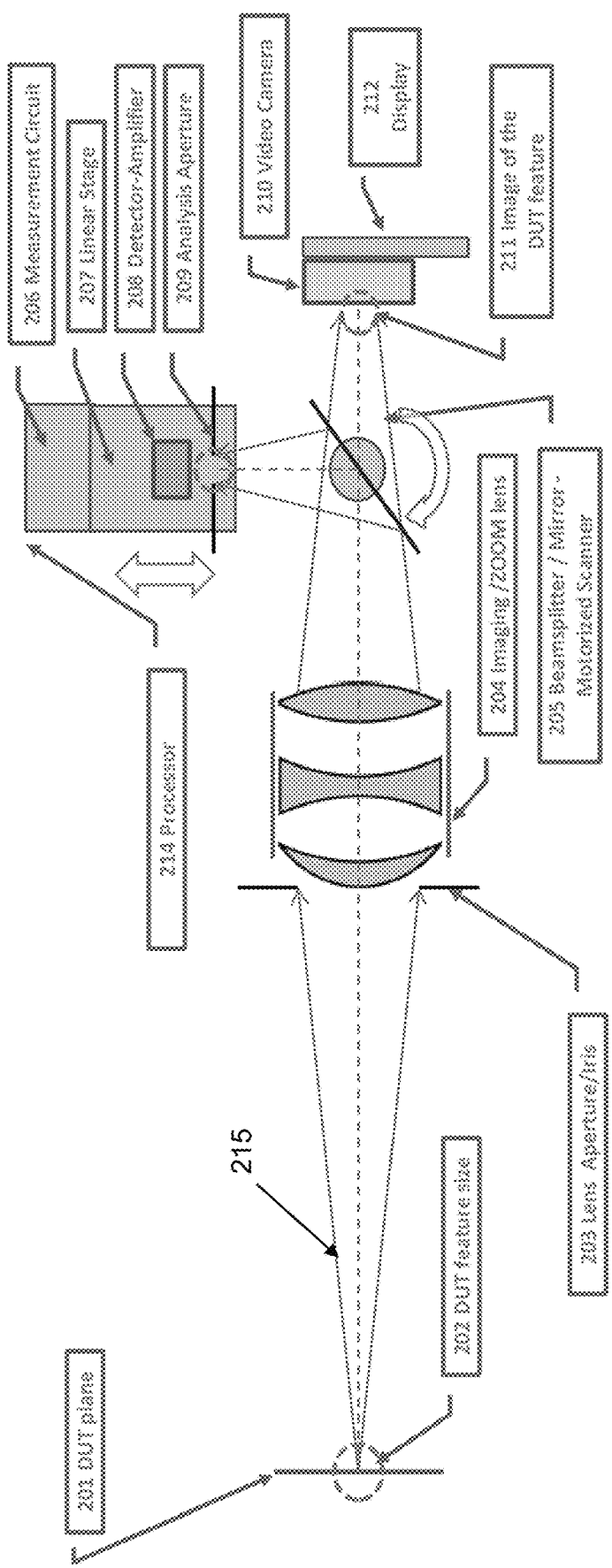
FIG. 2 is an exemplary block diagram of a receiving (collection) system for a retroreflectometer, according to some embodiments of the present disclosure.

In some embodiments, the angle between the light source and detectors, defined as the observation angle by the ASTM, is set by utilizing a digital distance finder and automatically adjusting the physical angle between the optical axis of the Illuminating System in FIG. 1 and collection system FIG. 2 and a convergence between them. In some embodiments, the orientation of the retroreflective object in space is determined by utilizing three digital distance finders and the well-known triangulation method.

FIG. 1 is an exemplary block diagram of an illuminating optical system for a retroreflectometer, according to some embodiments of the present disclosure. As shown, the system comprises of a light source 102, for example, a broadband pulsed light source with an optical pathway along which an illumination light beam (110 and 112) from the broadband pulsed light source travels and ends at the retroreflective surface of a device under test (DUT) 108 to be measured.

In some embodiments, the light source is a high-power broadband white light source, which is pulsed, for example, at a frequency between 25 and 50 Hz, with a low duty cycle of 2-4%. The light beam from the light source exits from a field aperture 103 and emitted to a moving (e.g., rotating) mirror 105 actuated by a synchronized motor, such a step motor 113 causing the light beam reflected from the moving mirror 105 to change its direction move (scanned). The moving light is then collimated using a collimating lens 104, such as multi-element objective lens with, for example, a 300 mm focal length.

The collimated moving light 112 is then scanned on an illumination spot 106 on the DUT 108. In some embodiments, the location of the illumination spot 106 on the DUT 108 is selected by pointing the retroreflectometer via a viewfinder at the DUT. The illumination spot 106 changes its location during scanning. In some embodiments, the light source 102 is mounted to a linear stage/platform 101 to adjust the distance between it and the collimating lens 104 to set the size of the spot 106 properly based on the measured distance. The observation angle is defined to be the angle between the light source and the collection optics (304 in FIG. 3), which mimics the angle between the vehicle headlights and the driver's eyes. The physical angle 304 between the optical axis of the light collector 308 and illuminator 312 and their convergence point 300 at the DUT is adjusted by a synchronized motion of the linear stage 311 and goniometer 310. The angle 304 is set by the Goniometer 310 and the convergence point is controlled by the linear stage 311. (see, for example, FIG. 3), utilizing the well-known law of tangents.

To deal with the challenge of keeping the instrument steady while taking a measurement, in some embodiments, the illumination beam is swept by the moving (motorized) mirror 105 in small angular increments in the horizontal plane and multiple measurements (e.g., between 40 and 500) are taken in a rapid succession burst mode, for example, a step angle of between 0.01 and 0.05 degrees and a full angular spread of +/−2 to 5 degrees. Also, to help keep the instrument steady, some embodiments place the instrument onto a tri-pod or a mono-pod.

FIG. 2 is an exemplary block diagram of a receiving (collection) system for a retroreflectometer, according to some embodiments of the present disclosure. As depicted, a second optical pathway along which a retroreflected beam 215 travels back from the measurement spot 202 on the retroreflective surface of the DUT 201 to an analysis aperture 209 in front of a detector-amplifier 208, for example, a photometrically corrected detector/amplifier or a color measurement detector/amplifier. The retroreflected beam 215 first goes through a lens aperture/iris 203 and then reflected by a moving (motorized) mirror/scanner 205 that controls the position of the measurement spot 202 on the DUT 201. To maintain the concentricity of the illumination spot 302 and measurement spot 301 on the DUT 300 (see, e.g., FIG. 3), the motorized mirrors 105 and 205 are moved in synchronization (controlled by a processor 214). The convergence of the spots 301 and 302 is maintained by adjusting the angle of the steering mirror 305 and the position of the goniometer 310 on the linear stage 311 as the distance to the DUT 300 changes.

In some embodiments, an imaging lens 204, for example, a zoom lens system includes a variable focal length between 18 and 400 mm. This achieves a constant magnification for any distance to the DUT between 1 and 20 meters. A camera 210 provides a live image of the DUT, and in conjunction with a display 212, aids in selecting a scan/measurement location on the DUT. For example, the retroreflectometer may be pointed at the DUT and the display is the viewfinder allowing the alignment.

The retroreflected beam from the motorized scanner and beamsplitter 205 enters an analysis aperture 209 and enters a detector-amplifier 208 that is coupled in conjunction with the pulsed illumination source (e.g., 102 in FIG. 1). The retroreflected light reaching the detector-amplifier 208 produces a photocurrent proportional to the intensity of the received light. A high-gain current-to-voltage amplifier is used to provide voltage signal to an analog-to-digital converter (ADC) (shown as parts of the detector-amplifier 208) that converts a voltage to a digital number. Although the detector and ADC are shown in the same block 208 for simplicity, one skilled in the art would recognize that these are separate electrical devices and may be implemented separately.

The detector is positioned on a linear stage 207 which in some embodiments assists in controlling the measurement spot size on the DUT 201. The scanner with a beam splitter (shown as part of 205) allows for scanning of the image plane by the analysis aperture 209, for example, at a 25-50 Hz rate. The measurement circuit 206 converts the raw optical signal into an electrical signal. To eliminate the effects of ambient light, the measurement circuit is AC-coupled to the pulsed light source. In some embodiments, a processor 214 is electrically coupled to the ADC (part of 206) with an accompanying memory to store operating logic (firmware and/or software) to determine the photometric intensity of a predetermined pattern of the retroreflected beam incident to the detector which defines the retroreflected light which propagates from the retroreflective surface, using know methods. For example, output from the detector-amplifier 208 is delivered to the processor 214 with associated controls, memory, power supply, and analog-to-digital converter. The processor 214 is coupled to user-interface and visual-display components 212. The processor 214 is also coupled to a global position sensor 424. One or more sensors (e.g., 424 in FIG. 4) enable recordation of the location of the sign or marker being measured. The processor 214 provides the information for the retroreflective performance of the DUT, for example, on the display 212.

Figure 3:
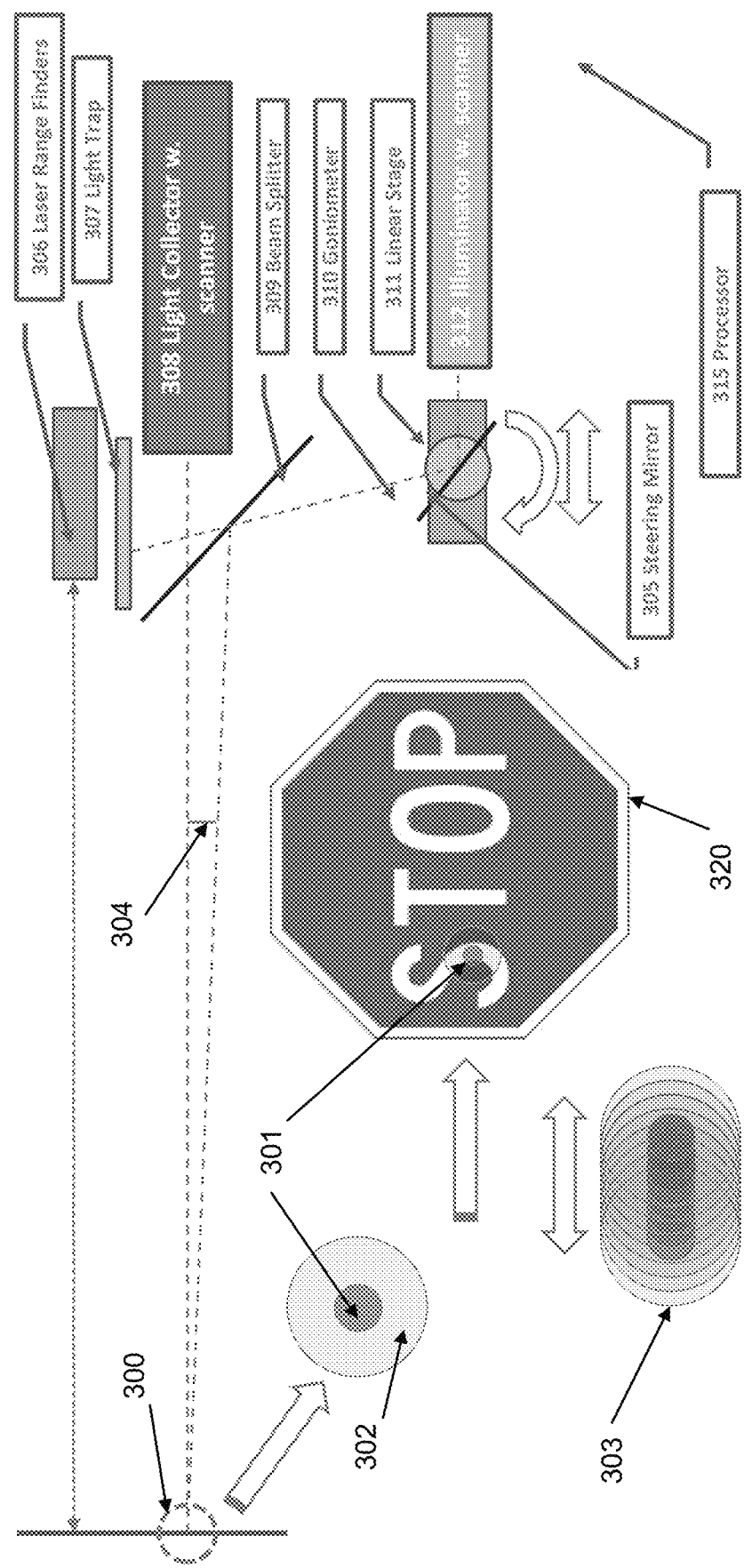
FIG. 3 is an exemplary block diagram of a retroreflectometer, according to some embodiments of the present disclosure.

FIG. 3 is an exemplary block diagram of a retroreflectometer, according to some embodiments of the present disclosure. As shown the retroreflectometer includes a light source (e.g., 102 in FIG. 1) for emitting a light beam; a first moving mirror assembly (e.g., 105 in FIG. 1) for scanning the light beam; a collimating lens (e.g., 104 in FIG. 1) for collimating the scanning light on an illumination spot on the surface of the DUT; an imaging lens (e.g., 204 in FIG. 2) for receiving a reflected scanning light comprised of the collimated scanning light reflected from the surface of the DUT; a second moving mirror assembly (e.g., 205 in FIG. 2) for controlling a predetermined observation angle, wherein the first moving mirror assembly and the second moving mirror assembly moved in synchronization to maintain concentricity of the illumination spot on the surface of the DUT; a light collector 308 for collecting the reflected light from the second moving mirror assembly; a processor 315 including a memory for determining the optical characteristics of the surface of the DUT responsive to the collected reflected light.

In some embodiments, the distance and orientation to a DUT 300 is determined, for example, by a laser range finder 306. Next, a moving illuminator 312 moves to the proper spacing away from the light collector based on the distance from the DUT to maintain a proper observation angle 304 by invoking the law of tangents to calculate the proper observation angle between the illuminator 312 and the light collector 308 for example, according to ASTM specifications. A light collector with scanner 308, similar to the receiving (collection) system of FIG. 2 collects the reflected light from the illuminator 312 and reflected off the DUT 300. In some embodiments, both the moving illuminator 312 and light collector 308 scans the DUT surface within the predefined angular range 304, for example, utilizing a steering mirror 305, in the horizontal plane using burst mode while data is being collected (303).

A measurement spot 301 on the DUT, for example, a STOP sign 320, is selected from a measurement field 302, by scanning 303 the measurement field. For small areas, like the legend on a STOP sign, scanning the measurement field and selecting the peak measurement across all the measurements ensures that the measurement field is directly on the legend and not partially off of it. The light collector with scanner 308 collects the reflected light, for example, via a beamsplitter 309, a goniometer 310 and a linear stage 311 (similar to 207 in FIG. 2). A processor 315 with an accompanying memory determines the photometric intensity of a predetermined pattern of the retroreflected beam incident to the detector which defines the retroreflected light which propagates from the retroreflective surface and provides the information regarding the retroreflective performance of the DUT, as described above with respect to FIG. 2.

In some embodiments, the retroreflectometer rejects the light from the illuminator 312 after it passes through the beamsplitter 309, for example using a light trap 307, so that the light collector 308 will not see the light scattered inside the instrument.

FIGS. 4A-4E depict various views of a retroreflectometer, according to some embodiments of the present disclosure. FIG. 4A shows the left side view, FIG. 4B shows the rear view, FIG. 4C shows the right view, FIG. 4D shows the top view and FIG. 4E shows the front view. The front side view shows the optics and the rear side view shows the display and control switches. In some embodiments, there are two handles—one at each side of the portable retroreflectometer for eases of handling and, moving and targeting the portable retroreflectometer.

Mounting Feature 403 and 404 facilitate mounting the retroreflectometer on a vehicle/platform. Measurement handles 406 & 416 help secure the device housing 408. Rear panel control buttons 412 are part of the user interface to input commands to the device and display 414 displays information, while a thermal printer module 418 is used to print reports and other information. A rechargeable battery 420 powers the device. Instrument measurement windows 426 and 428 are used to perform the measurements and laser range finder 428 is used to measure the distance to the DUT. Carrying handles 424 and 426 are used to carry the device. A GPS antenna 424 receives (and transmits) GPS signals. A power inlet 432 connects the device to a vehicle (or other platforms), and a power switch 431 is used to turn the power on/off. A laser range finder 430 is used to measure the distance to the DUT.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended drawings.

What is claimed is:

1. A retroreflectometer for non-contact measurements of optical characteristics of a surface of a device under test (DUT) comprising:
    a light source for emitting a light beam, in a first optical path;
    a first moving mirror assembly for scanning the light beam;
    a collimating lens for collimating the scanning light on an illumination spot on the surface of the DUT;
    an imaging lens for receiving a reflected scanning light comprised of the collimated scanning light reflected from the surface of the DUT, in a second optical path different from the first optical path;
    a second moving mirror assembly for controlling a predetermined observation angle, wherein the first moving mirror assembly and the second moving mirror assembly move in synchronization to maintain concentricity of the illumination spot on the surface of the DUT, and wherein the predetermined observation angle is determined by triangulating the distance to three points on the surface of the DUT and setting the observation angle based on the measured distance from the DUT;
    a light collector for collecting the reflected light from the second moving mirror assembly; and
    a processor including a memory for determining the optical characteristics of the surface of the DUT responsive to the collected reflected light, wherein the processor controls the synchronization of the first moving mirror assembly and the second moving mirror assembly.

2. The retroreflectometer of claim 1, further comprising a display for displaying information about the optical characteristics of the surface of the DUT.

3. The retroreflectometer of claim 1, wherein the processor determines the optical characteristics based on a predetermined pattern of the reflected light from the second moving mirror assembly.

4. The retroreflectometer of claim 1, wherein the light collector collects the reflected light from the second moving mirror assembly via a beamsplitter and a goniometer.

5. The retroreflectometer of claim 4, wherein the goniometer measures spatial distribution of light at the predetermined observation angle and allows steering the first moving mirror assembly and the second moving mirror assembly to a precise angular position, by the processor.

6. The retroreflectometer of claim 1, further comprising a camera for capturing an image of the illumination spot on the surface of the DUT and in conjunction with a display for visual alignment of the illumination spot on the surface of the DUT.

7. The retroreflectometer of claim 1, further comprising a measurement circuit for converting the collected reflected light into an electrical signal.

8. The retroreflectometer of claim 1, wherein the imaging lens includes a variable focal length between 18 and 400 mm.

9. The retroreflectometer of claim 1, wherein the light source emits a broadband pulsed light beam.

10. The retroreflectometer of claim 9, wherein the broadband pulsed light beam is a high powered broadband white light source pulsed at a frequency range between 25 and 50 Hz.

11. The retroreflectometer of claim 1, wherein the collimating lens is an achromat doublet lens with a focal length of about 300 mm.

12. The retroreflectometer of claim 1, further comprising a light trap for trapping ambient lights.

13. The retroreflectometer of claim 1, further comprising a laser range finder for determining a distance and orientation of the retroreflectometer to the DUT.

* * * * *